(12) United States Patent
Mittal et al.

(10) Patent No.: US 10,970,284 B2
(45) Date of Patent: Apr. 6, 2021

(54) DYNAMIC SELF-RECONFIGURATION OF NODES IN A PROCESSING PIPELINE

(71) Applicant: Oracle International Corporation, Redwood Shores, CA (US)

(72) Inventors: Ashish Mittal, Foster City, CA (US); Steve Simon Joseph Fernandez, Columbia, MO (US); Kenneth Khiaw Hong Eng, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 292 days.

(21) Appl. No.: 15/977,816

(22) Filed: May 11, 2018

(65) Prior Publication Data

US 2018/0329956 A1    Nov. 15, 2018

Related U.S. Application Data

(60) Provisional application No. 62/505,741, filed on May 12, 2017.

(51) Int. Cl.
*G06F 16/24* (2019.01)
*G06F 16/2453* (2019.01)
*G06F 9/445* (2018.01)
*G06F 9/38* (2018.01)
*G06F 16/2455* (2019.01)

(52) U.S. Cl.
CPC ...... *G06F 16/24549* (2019.01); *G06F 9/3867* (2013.01); *G06F 9/44505* (2013.01); *G06F 16/2455* (2019.01)

(58) Field of Classification Search
CPC .......... G06F 16/24549; G06F 16/2455; G06F 9/44505; G06F 9/3867; G06F 16/334; G06F 16/8373
See application file for complete search history.

(56) References Cited

U.S. PATENT DOCUMENTS

| 2003/0120682 | A1* | 6/2003 | Bestgen | G06F 16/24526 |
| 2015/0269202 | A1* | 9/2015 | Ku | G06F 16/24542 707/715 |
| 2016/0026663 | A1* | 1/2016 | Krishnamurthy | G06F 9/50 707/741 |
| 2018/0089270 | A1* | 3/2018 | Qiu | G06F 16/24545 |

\* cited by examiner

*Primary Examiner* — Mohammed R Uddin
(74) *Attorney, Agent, or Firm* — Kilpatrick Townsend & Stockton LLP

(57) ABSTRACT

A query optimization system is described that, at runtime, optimizes the execution pipeline generated for a query. Based upon communications between nodes in the execution pipeline, the execution pipeline generated for a query is optimized by modifying the execution pipeline to create a modified execution pipeline. The modified execution pipeline is then executed to execute the query and results obtained for the query. The changes or modifications made to an execution pipeline may include changing the capabilities (e.g., changes to inputs and/or outputs of a node, changing the task(s) or function(s) performed by the node) of one or more nodes within the execution pipeline. The changes may include changing the position of one or more nodes within a directed acyclic graph representing the execution pipeline.

10 Claims, 10 Drawing Sheets

DYNAMIC SELF-RECONFIGURATION OF NODES IN A PROCESSING PIPELINE

CROSS-REFERENCES TO RELATED APPLICATIONS

The present application is a non-provisional of and claims the benefit and priority under 35 U.S.C. 119(e) of U.S. Provisional Application No. 62/505,741 filed May 12, 2017, entitled DYNAMIC SELF-RECONFIGURATION OF NODES IN A PROCESSING PIPELINE, the entire contents of which are incorporated herein by reference for all purposes.

BACKGROUND

Data records are frequently stored in one or more databases. Queries (e.g., an SQL query) are used to request specific information from these databases. A data processing system may execute the query on the one or more databases in order to retrieve, from the one or more databases, those data records that are relevant to the query. These retrieved data records may then be output as results of that query. In some instances, the query may also specify how the retrieved data records are to be manipulated and/or processed and the results of the manipulations and/or processing may then be output as the result of that query.

In a query processing engine, an input query (e.g., some form of SQL query) is translated into an execution pipeline consisting of multiple nodes, with each node configured to receive an input, perform incremental processing on its input, and produce an output, which, in some cases may then be provided as input to another node. Raw data from the input sources is streamed through the execution pipeline and the output of the final node is the result of the query.

Given the widespread use of queries, it is important that query execution be performed in an efficient and timely manner. Developers are constantly looking for ways to improve query execution since these improvements have a huge impact on the performance of applications using the queries.

BRIEF SUMMARY

The present disclosure relates generally to techniques for improving the execution of queries, such as queries for one or more databases. More specifically, a query optimization system is described that, at runtime, when a query is to be executed, optimizes the execution pipeline generated for a query. The execution pipeline comprises multiple nodes configured to perform various tasks involved in the query processing at different stages in the processing pipeline in order to generate output results for the query. In certain embodiments, based upon communications between nodes in the execution pipeline, the execution pipeline generated for a query is optimized by modifying the execution pipeline to create a modified execution pipeline. The modified execution pipeline is then executed to execute the query and results obtained for the query. Various inventive embodiments are described herein, including methods, systems, non-transitory computer-readable storage media storing programs, code, or instructions executable by one or more processors, and the like.

In certain embodiments, the execution pipeline comprises a directed acyclic graph including multiple nodes. A node within an execution pipeline may take in one or more inputs, perform one or more functions or tasks, and output one or more outputs. In this manner, inputs to the query are processed by the execution pipeline to generate query results. This execution pipeline is optimized by making changes and modifications to the execution pipeline. The changes or modifications made to an execution pipeline as part of the optimization may include changing the capabilities (e.g., changes to inputs and/or outputs of a node, changing the task(s) or function(s) performed by the node) of one or more nodes within the execution pipeline. The changes may include changing the position of one or more nodes within the directed acyclic graph representing the execution pipeline.

In certain embodiments, the optimization-related changes made to an execution pipeline are based upon inter-nodal communications between the nodes in the execution pipeline. The inter-nodal communications enable nodes within the execution pipeline to advertise their capabilities to other nodes in the execution pipeline and for the nodes to learn and assess the capabilities of other nodes in the execution pipeline. For instance, a node may be able to communicate or advertise its capabilities to its immediate neighboring nodes in the pipeline and also learn the capabilities of its neighboring nodes and other nodes. A particular node within the execution pipeline may then decide to reconfigure itself based upon its capabilities and based upon the processing capabilities the particular node has learned of other nodes (e.g., its neighbors or other nodes) in the execution pipeline.

In certain embodiments, a node may reconfigure itself by changing its capabilities (e.g., changes to inputs and/or outputs of a node, changing the task(s) or function(s) performed by the node). A node may also reconfigure itself by changing its position within the execution pipeline, for example, by changing its position within the directed acyclic graph representing the execution pipeline. These changes are meant to make the execution of the execution pipeline more efficient and faster. As a result of such reconfigurations, the execution pipeline initially generated for a query is modified to generate a modified execution pipeline. The modified execution pipeline may then be executed to get the query results in an optimal manner.

As a result of the inter-nodal communications, the nodes within an execution pipeline are able to consider the current execution environment or context and are able to dynamically reconfigure themselves to optimize the query execution for that particular execution instance. The optimization may result in more efficient handling of data within the execution pipeline and may lead to faster execution of the query for that execution instance. The resulting, reconfigured or modified execution pipeline may be more adapted to fulfilling the query using the available capabilities of the nodes in that particular execution instance than the initial non-modified configuration of the pipeline.

Various inventive embodiments are described herein, including methods, systems, non-transitory computer-readable storage media storing programs, code, or instructions executable by one or more processors, and the like. In certain embodiments, a data processing system may receive a query and generate a query plan for the query. At runtime when the query is to be executed, an execution pipeline may be instantiated for executing the query based upon the query plan, wherein the execution pipeline comprises a directed acyclic graph comprising a plurality of nodes. A first node in the plurality of nodes may determine the capabilities of a set of one or more other nodes in the plurality of nodes. Based upon the capabilities of the set of other one or more nodes, a change may be identified to be made to the execution pipeline, the change involving the first node. The identified change may then be applied to the execution pipeline to create a modified execution pipeline. The modified execution pipeline may then be executed to execute the query.

In certain embodiments, the change that is made to the execution pipeline may include changing a capability of the first node. For example, a type of an input or an output of the first node may be changed from a first type to a second type different from the first type. For example, the first type may be a fixed length record type and the second type may be a variable length record type. As another example, changing the capability of the first node may comprise changing a function performed by the first node. For example, changing the function performed by the first node may include changing the function performed by the first node from handling a fixed length record type to handling a variable length record type.

In certain embodiments, the change to the execution pipeline may include changing a position of the first node within the directed acyclic graph. For example, prior to applying the change to the execution pipeline, the first node is positioned downstream in the directed acyclic graph from a second node in the plurality of nodes, and the change involves changing the position of the first node within the directed acyclic graph to a new position within the directed acyclic graph wherein the first node is upstream from the second node in the modified execution pipeline.

In certain embodiments, prior to changing the execution pipeline, the first node is at a first distance from a source root node in the directed acyclic graph, and after changing the execution pipeline, the first node is moved to a new position within the directed acyclic graph at a second distance from the source root node, where the second distance is different from the first distance. In some instances, the second distance may be less than the first distance. In some other instances, the second distance may be greater than the first distance.

In certain embodiments, a node within the execution pipeline (e.g., the first node) may use inter-nodal communications to determine the capabilities of the set of other nodes in the execution pipeline. For example, in certain embodiments, the first node may communicate its capabilities to its one or more neighboring nodes within the execution pipeline, and the first node may receive information from its neighboring nodes identifying capabilities of the other nodes, including capabilities of neighbor nodes and non-neighbor nodes.

The foregoing, together with other features and embodiments will become more apparent upon referring to the following specification, claims, and accompanying drawings.

DETAILED DESCRIPTION

Figure 1:
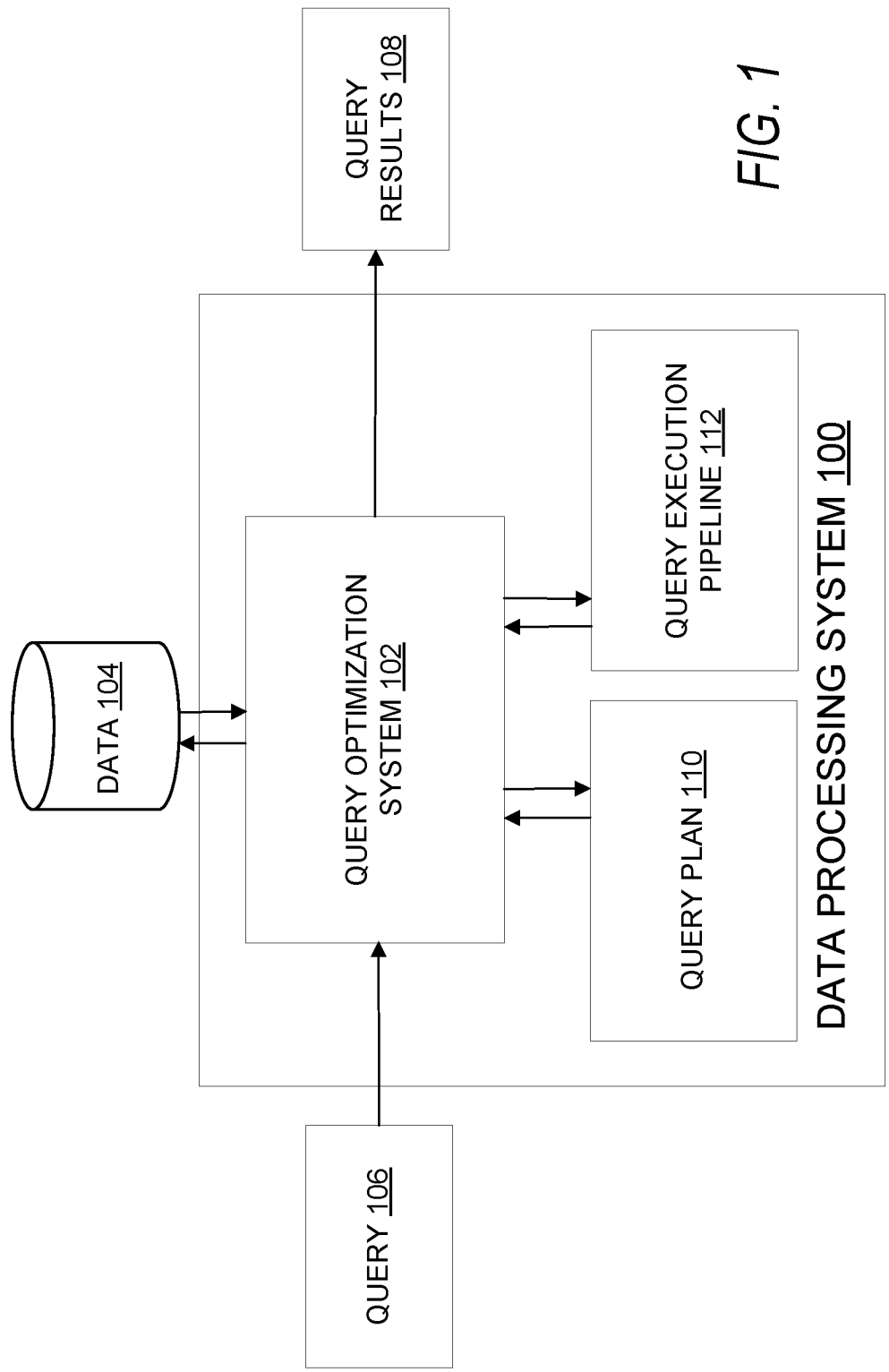
FIG. 1 is a simplified block diagram of a data processing system capable of performing optimized query processing via the dynamic reconfiguration of execution pipelines, according to certain embodiments.

In the following description, for the purposes of explanation, specific details are set forth in order to provide a thorough understanding of the embodiments described in this application. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

The present disclosure relates generally to techniques for improving the execution of queries, such as queries for one or more databases. More specifically, a query optimization system is described that, at runtime, when a query is to be executed, optimizes the execution pipeline generated for a query. The execution pipeline comprises multiple nodes configured to perform various tasks involved in the query processing at different stages in the processing pipeline in order to generate output results for the query. In certain embodiments, based upon communications between nodes in the execution pipeline, the execution pipeline generated for a query is optimized by modifying the execution pipeline to create a modified execution pipeline. The modified execution pipeline is then executed to execute the query and results obtained for the query. Various inventive embodiments are described herein, including methods, systems, non-transitory computer-readable storage media storing programs, code, or instructions executable by one or more processors, and the like.

In certain embodiments, the execution pipeline comprises a directed acyclic graph including multiple nodes. A node within an execution pipeline may take in one or more inputs, perform one or more functions or tasks, and output one or more outputs. In this manner, inputs to the query are processed by the execution pipeline to generate query results. This execution pipeline is optimized by making changes and modifications to the execution pipeline. The changes or modifications made to an execution pipeline as part of the optimization may include changing the capabilities (e.g., changes to inputs and/or outputs of a node, changing the task(s) or function(s) performed by the node) of one or more nodes within the execution pipeline. The changes may include changing the position of one or more nodes within the directed acyclic graph representing the execution pipeline.

In certain embodiments, the optimization-related changes made to an execution pipeline are based upon inter-nodal communications between the nodes in the execution pipeline. The inter-nodal communications enable nodes within the execution pipeline to advertise their capabilities to other nodes in the execution pipeline and for the nodes to learn and assess the capabilities of other nodes in the execution pipeline. For instance, a node may be able to communicate or advertise its capabilities to its immediate neighboring nodes in the pipeline and also learn the capabilities of its neighboring nodes and other nodes. A particular node within the execution pipeline may then decide to reconfigure itself based upon its capabilities and based upon the processing capabilities the particular node has learned of other nodes (e.g., its neighbors or other nodes) in the execution pipeline.

In certain embodiments, a node may reconfigure itself by changing its capabilities (e.g., changes to inputs and/or outputs of a node, changing the task(s) or function(s) performed by the node). A node may also reconfigure itself by changing its position within the execution pipeline, for example, by changing its position within the directed acyclic graph representing the execution pipeline. These changes are meant to make the execution of the execution pipeline more efficient and faster. As a result of such reconfigurations, the execution pipeline initially generated for a query is modified to generate a modified execution pipeline. The modified execution pipeline may then be executed to get the query results in an optimal manner.

As a result of the inter-nodal communications, the nodes within an execution pipeline are able to consider the current execution environment or context and are able to dynamically reconfigure themselves to optimize the query execution for that particular execution instance. The optimization may result in more efficient handling of data within the execution pipeline and may lead to faster execution of the query for that execution instance. The resulting, reconfigured or modified execution pipeline may be more adapted to fulfilling the query using the available capabilities of the nodes in that particular execution instance than the initial non-modified configuration of the pipeline.

FIG. 1 is a simplified block diagram of a data processing system 100 capable of performing optimized query processing via the dynamic reconfiguration of execution pipelines according to certain embodiments. Data processing system 100 depicted in FIG. 1 is merely an example and is not intended to unduly limit the scope of claimed embodiments. One of ordinary skill in the art would recognize many possible variations, alternatives, and modifications. For example, in some implementations, data processing system 100 may have more or fewer systems or components than those shown in FIG. 1, may combine two or more systems, or may have a different configuration or arrangement of systems. In some embodiments, the data processing system 100 may be a server or cloud computing cluster, such as a backend server designed to process queries of a database. Data processing system 100 may include one or more computer systems or devices.

As depicted in FIG. 1, data processing system 100 may include a query optimization system 102. In some embodiments, the query optimization system 102 may be configured to receive one or more queries 106. The query optimization system 102 may then execute the query and obtain query results 108. The query results 108 may then be output and/or used for downstream processing.

Query results 108 may include data records retrieved from querying data 104 as a result of executing the query. In some embodiments, data 104 may be stored on external storage, which may include non-volatile memory to store data that is to be persisted. Examples of this external storage include floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like. Data 104 may be stored in different formats. For example, in certain embodiments, data 104 may be stored in one or more databases, and the query may be executed against these databases to obtain query results 108.

In some embodiments, the process of executing a query may be broken into multiple phases. Upon receiving a query 106, the query optimization system 102 may generate a query plan 110 based on at least the received query 106. In some embodiments, the query optimization system 102 may also consider the structure of data 104 to be queried in generating query plan 110. The query plan 110 is a query execution plan created for that specific query 106. The query optimization system 102 may determine which processing methods are suitable for processing the input query. In some cases, the query optimization system 102 may determine the most efficient way to execute a given query by generating a query plan that eliminates redundant operations, combines operations, etc., with the goal of minimizing query processing time.

A query received by query optimization system 102 typically describes what data is needed from the data being queried. Query optimization system 102 is configured to parse an input query, determine the best way to obtain the requested data, and come up with a plan to obtain the requested data. This is stored as the query plan (or execution plan) 110. As an example, query optimization system 102 may receive an example query (shown below) for querying data stored in a database, for example, a database provided by Oracle Corporation® of Redwood Shores, Calif.

Example Query: select distinct u.first_name, u.last_name, b.programmer from bug_user u, bug_rpthead b where b.programmer=u.bug_username Upon receiving the Example Query, query optimization system 102 may generate a query plan detailing the steps to be performed on the data, shown in Table A:

TABLE A

| Id | Operation | Name | Rows | Bytes | TempSpc | Cost (% CPU) | Time |
|---|---|---|---|---|---|---|---|
| 0 | SELECT STATEMENT | | 95864 | 3182K | | 329K (1) | 00:00:13 |
| 1 | HASH UNIQUE | | 95864 | 3182K | 3768K | 329K (1) | 00:00:13 |
| *2 | HASH JOIN SEMI | | 95864 | 3182K | 6352K | 328K (1) | 00:00:13 |
| 3 | TABLE ACCESS FULL | BUG_USER | 175K | 4289K | | 1274 (1) | 00:00:01 |
| 4 | TABLE ACCESS FULL | BUG_RPTHEAD | 24M | 209M | | 302K (1) | 00:00:12 |

Predicate Information (identified by operation id):
  2—access
("B"."PROGRAMMER"="U"."BUG_USERNAME")

In some embodiments, parts of different query plans may be pre-defined/pre-generated and stored in advance, and the query plan 110 may be generated based on those pre-defined parts.

In some embodiments, at runtime, when the query 106 is to be executed, the query optimization system 102 may generate and instantiate, in system memory, a query execution pipeline 112 based upon the generated query plan 110. The resulting query execution pipeline 112 may comprise a graph (e.g., a directed acyclic graph (DAG)) comprising multiple nodes. In certain embodiments, portions of the execution pipeline may be instantiated based upon cached chains of nodes. Based upon the inter-nodal communications between the nodes of the execution pipeline, the query optimization system 102 may perform various optimizations on the execution pipeline 112. The optimizations may result in the creation of a modified execution pipeline 112. The modified execution pipeline 112 may then be executed by query optimization system 102 on data 104 to generate query results 108. Query results 108 may include data records obtained from data 104 that are relevant to and selected based upon query 106. In certain embodiments, portions of the modified execution pipeline may be cached.

In some embodiments, the query execution pipeline 112 may be a graph (e.g., a directed acyclic graph) comprising multiple nodes. In some embodiments, a node in execution pipeline 112 may be an application or process or thread executed by one or more processors of the data processing system 100. For instance, in one example, the nodes of execution pipeline 112 may be processes that are loaded in the system memory of the data processing system 100 and executed, possibly concurrently, by processor(s) of the data processing system 100. The processor(s) may be configured to execute or run instructions (e.g., code, code objects) for implementing the functions performed by the nodes. These functions may include database-related tasks, sorting functions, and the like. The processors may include single core processors or multicore processors. The processors may execute one or more virtual machines.

The multiple nodes in execution pipeline 112 may be configured to perform various tasks involved in the query processing at different stages in the processing pipeline in order to generate output results for the query. Each node within execution pipeline 112 may have input and output capabilities. A node within execution pipeline 112 may take in one or more inputs, perform one or more functions or tasks, and output one or more outputs. A node may receive an input from a data source or a node immediately upstream, perform processing on that input, and then generate an output to a node immediately downstream, or the output of the last node may represent the output results of the query execution. In this manner, inputs to the query are processed by the nodes of the execution pipeline to generate query results. Each node may carry out one or more tasks or functions in the query execution pipeline 112 executed by the data processing system 100 for processing the query 106. Multiple nodes may be in execution concurrently and in parallel.

As indicated above, in certain embodiments, execution pipeline 112 may be a directed acyclic graph comprising multiple nodes. The directed acyclic graph may comprise nodes and directed edges, each directed edge connecting two nodes. In the directed acyclic graph, a directed edged from a first node to a second node indicates that the output from the first node is provided as input to the second node. For a directed edge starting from a first node and ending at a second node, the first node may be referred to as the head of the edge and the second node may be referred to as the tail of the edge. The tail node may be referred to as a child of the head node. The head node may be referred to as the parent of the tail node. The directed acyclic graph may start at a root node.

In certain embodiments, each node within execution pipeline 112 may take in one or more inputs, perform one or more functions or tasks, and output one or more outputs. The root node of the directed acyclic graph may receive as its inputs the one or more inputs that are provided as inputs to the query. The output from the last node in the directed acyclic graph may represent the results of the query. For the intermediate nodes in the directed acyclic graph of execution pipeline 112, between the root node and the last node, each intermediate node may receive inputs from one or more of its parent nodes and provide outputs to one or more of its child nodes.

For a particular node within execution pipeline 112, the set of nodes comprising the parents of the particular node and the children of the particular node may be referred to as the neighbors of the particular node. For a particular node within execution pipeline 112, a node in the directed acyclic graph is considered downstream from the particular node if the node is included in a sub-graph rooted at a child node of the particular node. A node in the directed acyclic graph is considered downstream from the particular node if there is a path that can be traversed in the directed acyclic graph from the particular node to that node. For a particular node within execution pipeline 112, a node in the directed acyclic graph is considered upstream from the particular node if there is a path that can be traversed in the directed acyclic graph from that node to the particular node.

Figure 10:
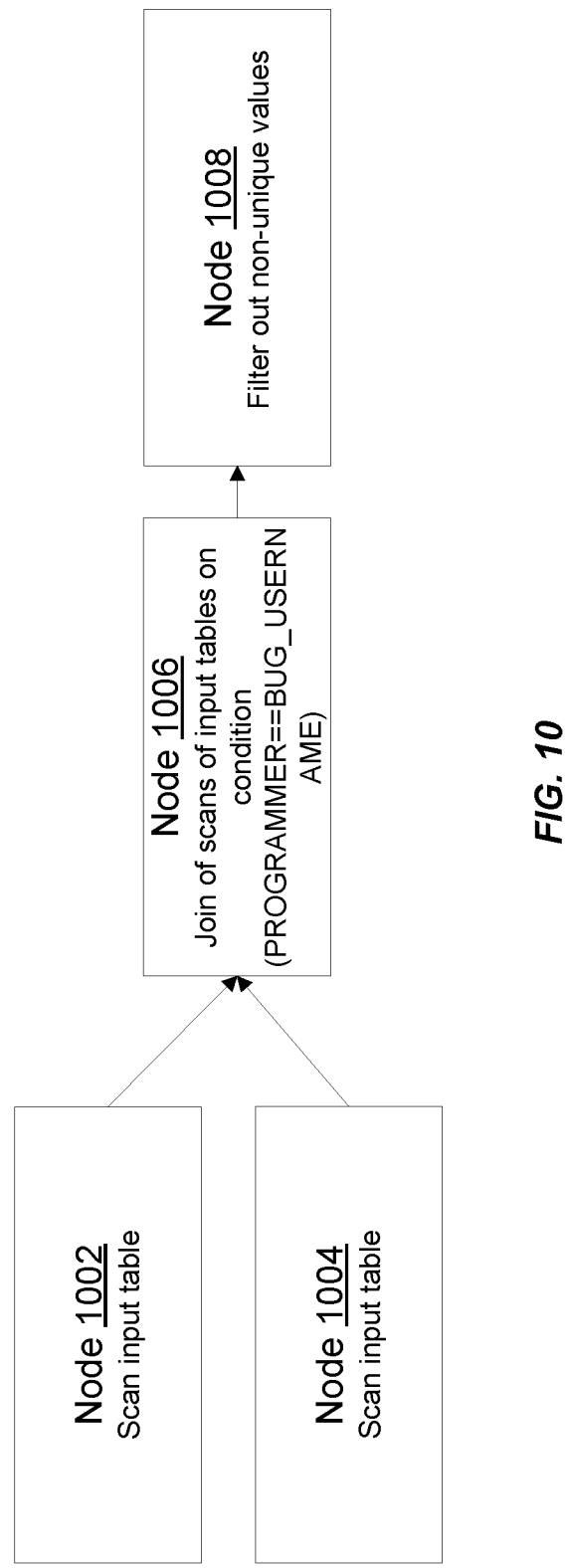
FIG. 10 depicts an example execution pipeline that may be instantiated according to certain embodiments.

For example, for the Example Query described above and the corresponding query plan shown in Table A, query optimization system 102 may instantiate an execution pipeline as depicted in FIG. 10. As shown in FIG. 10, the execution pipeline comprises four nodes 1002, 1004, 1006, and 1008. Each node is configured to take in one or more inputs, perform one or more functions using the inputs, and provide an output. For the execution pipeline shown in FIG. 10, the inputs, outputs, and functions performed by the nodes is summarized below.

Node 1002:
Inputs: Table BUG_USER
Function: Scan input table
Output: To Node 1006, results of scan operation
Node 1004:
Inputs: Table BUG_RPTHEAD
Function: Scan input table
Output: To Node 1006, results of scan operation
Node 1006:
Inputs: From Nodes 1002 and 1004
Function: JOIN of scans of input tables on condition (PROGRAMMER==BUG_USERNAME)
Output: To Node 1008, results of JOIN operation
Node 1008:
Inputs: From Node 1006
Function: Filter out non-unique values
Output: Results of filter operation→output result of query.

In certain embodiments, the nodes of the execution pipeline shown in FIG. 10 may, via inter-nodal communications, learn the capabilities and positions of other nodes in the execution pipeline. Based upon the information learned via these communications, query optimization system 102 may perform optimizations on the execution pipeline as described herein. The optimizations may result in the generation of a modified execution pipeline, which may then be executed to execute the query and obtain query results 108.

Building a query execution pipeline 112 from an input query 106 is often expensive in terms of computation time and processing power, and in some embodiments, a particular chain of nodes that execute a specific task may be pre-generated and used across multiple query execution pipelines associated with different queries. The generation of this chain of nodes (the components and their sequence within the chain) is expensive both in terms of CPU and memory. In some embodiments, the query optimization system 102 may be configured to instantiate the query execution pipeline 112 by combining pre-generated chains of nodes.

In some embodiments, the query optimization system 102 is configured to instantiate execution pipeline 112 based upon query plan 110. In generating the query plan 106, the query optimization system 102 may have no knowledge about certain capabilities of a particular node (e.g., whether a particular node can only handle fixed-length records, or if it can also handle variable-length records) since the internal execution within each node is separate from the steps needed to generate the results of a query. When the query execution pipeline 112 is instantiated by the query optimization system 102, the query optimization system 102 may be configured to select nodes for utilization based on their function without knowledge of how the internal execution of each of those nodes is configured. Thus, in some embodiments, any subsequent changes or updates to the query execution pipeline 112 involving the internal execution of the nodes in the query execution pipeline 112 may not be made directly by the query optimization system 112, but rather by the nodes themselves (e.g., via the dynamic reconfiguration of nodes).

Figure 2:
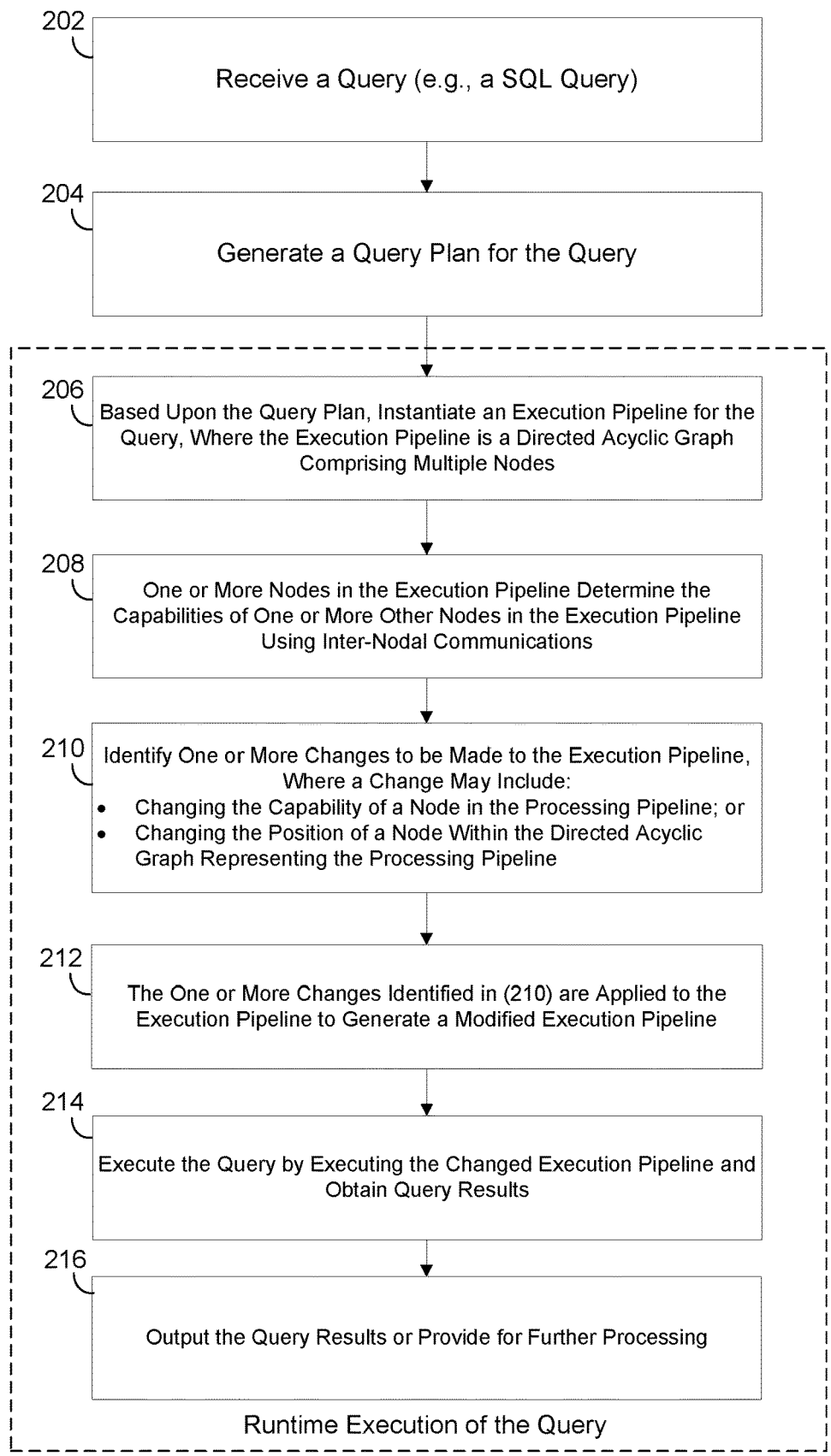
FIG. 2 is a flowchart illustrating a method of performing optimized query processing according to certain embodiments.

FIG. 2 is a flowchart illustrating a method of performing optimized query processing according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel.

In some embodiments, at block 202, a data processing system (e.g., data processing system 100 depicted in FIG. 1) may receive a query that is configured to query one or more data stores (e.g., databases) and generate query results. For example, the query received in 202 may be a SQL query for querying one or more databases.

At block 204, the data processing system may generate a query plan for the query received at block 202. In some embodiments, the query plan in 204 may be generated by the query optimization system of the data processing system. As part of the processing performed in 202, the query optimization system may select an initial, basic query execution plan and optimize that plan to generate an optimized execution plan (which may look like a diagram) for the query that dictates what the configuration of the query execution pipeline should be.

The query plan generated in 204 may then be used at runtime, when the query is to be executed, to create an execution pipeline instance for the query. Blocks 206, 208, 210, 212, 214, and 216 represent tasks that are performed at the time of runtime execution of the query.

At block 206, at runtime when the query is to be executed, the query optimization system of the data processing system may instantiate, in system memory, an execution pipeline for the query based on the query plan generated in 204. The execution pipeline generated in 206 may comprise a graph (e.g., a directed acyclic graph (DAG)) comprising multiple nodes. Each node within the execution pipeline generated in 206 may have input and output capabilities. A node within the execution pipeline may take in one or more inputs, perform one or more functions or tasks, and output one or more outputs.

At block 208, one or more nodes in the execution pipeline determine the capabilities of one or more other nodes in the execution pipeline using inter-nodal communications. In certain embodiments, the nodes in the execution pipeline are able to talk to each other, advertise their own capabilities, and also find out the capabilities of other nodes in the execution pipeline. In some embodiments, the nodes may communicate with one another using a common language such as, for example, using a common Application Programming Interface (API). This communication may follow a pre-defined protocol and communication among the nodes may be propagated throughout the pipeline in various ways. In some embodiments, each node in the query execution pipeline determines the capabilities of each other node in the processing pipeline. In other embodiments, some of the nodes in the execution pipeline may determine the capabilities of some of the other nodes in the query execution pipeline.

In some embodiments, a node in the query execution pipeline may advertise its capabilities to its neighboring nodes and receive information from its neighboring nodes about the capabilities of the neighboring nodes. For example, a node may communicate with nodes immediately upstream and downstream from the node. In some embodiments, a node in the query execution pipeline may also receive information of the capabilities of other nodes known to the neighboring nodes. In some embodiments, the communications between the nodes of the pipeline may have a flow-like structure; one node may communicate with its neighboring nodes, and those neighboring nodes may communicate with their neighboring nodes—creating a ripple effect of dissemination of capabilities information. Once a node receives information regarding its neighboring nodes and/or information regarding other nodes known to the neighboring nodes, that node may then advertise the information that it has received from its neighboring nodes and also information about its own capabilities to its neighboring nodes. In this manner, information about the capabilities of the multiple nodes in the query execution pipeline are advertised to all the nodes in the query execution pipeline.

In some embodiments, the communication between two nodes (e.g., immediately neighboring nodes) may occur in two stages. At a first stage, each node will ask their neighbor regarding the neighbor's capabilities, while also advertising its own capabilities. At the second stage of the communication, each node may communicate instructions to its neighboring nodes after taking into consideration the capabilities of the raw data streams (e.g., the capabilities of the upstream node between two nodes) as well as the capabilities of the consumer of the output stream (e.g., the capabilities of the downstream node between two nodes).

At block 210, the query optimization system may identify one or more changes to be made to the execution pipeline based upon the inter-nodal communications in 208. For example, the changes made to the execution pipeline in 210 may be based on the information that the nodes have collected about other nodes in the pipeline and their own capabilities. The changes or modifications may include changing the capabilities (e.g., changes to inputs and/or outputs of a node, changing the task(s) or function(s) performed by the node) of one or more nodes within the execution pipeline and/or changing the position of one or more nodes within the directed acyclic graph representing the execution pipeline.

At block 212, the one or more changes identified in 210 are applied to the execution pipeline to generate a modified execution pipeline. For example, the query optimization system may make the changes identified in block 210 to the execution pipeline instantiated in 206 to generate a modified optimized execution pipeline.

In certain embodiments, as part of the processing performed in 212, the nodes of the execution pipeline may be configured to make the changes identified in 210. Nodes may reconfigure themselves based on the capabilities of other nodes in the execution pipeline and based upon their own capabilities. A node may also take into consideration the capabilities of the raw data streams as well as the capabilities of the consumer of the output stream.

In certain embodiments, once a node has reconfigured itself, the node may inform its immediate neighbors about the reconfiguration. This may be performed by the various nodes in the execution pipeline that reconfigure themselves and the process is propagated throughout the execution pipeline. As a result of the reconfigurations, the initial configuration of the execution pipeline generated in 206 is changed from the initial configuration generated based on the query plan to a new more optimized configuration that is adapted to the capabilities of that particular execution instance.

At block 214, the query optimization system may execute the query by executing the changed execution pipeline and obtain query results. At block 216, the query results obtained in 214 may be output or may be provided for further processing.

Figure 3:
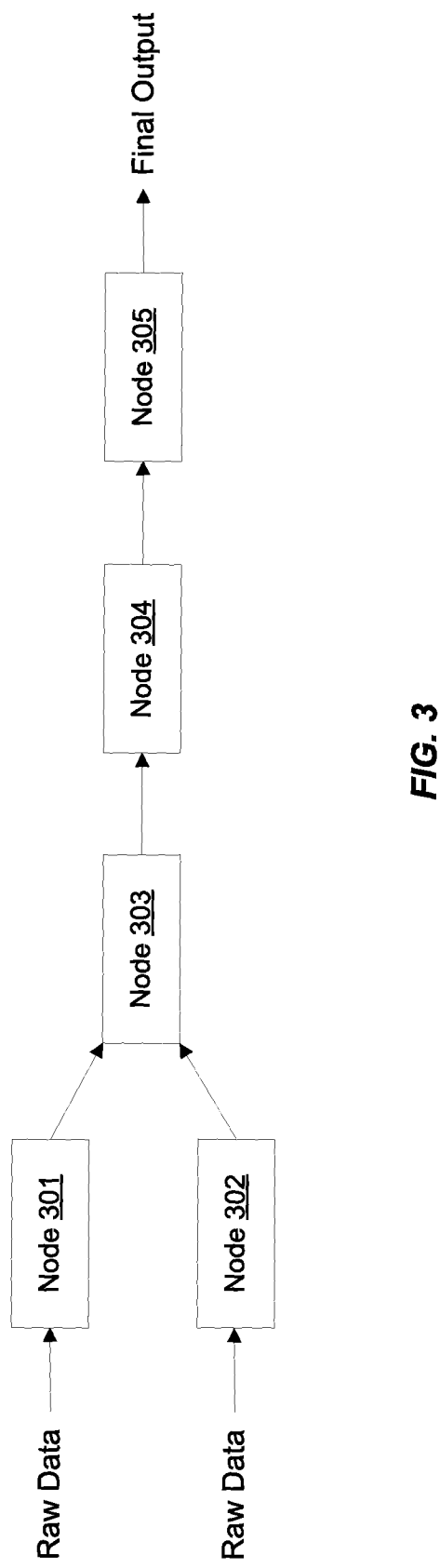
FIG. 3 illustrates an example of optimized query processing via the dynamic reconfiguration of nodes according to certain embodiments.

FIG. 3 illustrates an example of optimized query processing via the dynamic reconfiguration of nodes according to certain embodiments. The execution pipeline depicted in FIG. 3 is merely an example and is not intended to unduly limit the scope of claimed embodiments. One of ordinary skill in the art would recognize many possible variations, alternatives, and modifications. In some implementations, there may be a different number of nodes, the nodes may execute different functions from what is depicted, and/or the nodes may also be arranged differently. For instance, although FIG. 3 depicts an execution pipeline having a node 301, a node 302, a node 303, a node 304, and a node 305, in other embodiments, there may be a different number of nodes and they may be arranged differently in the execution pipeline. In the execution pipeline shown in FIG. 3, processing and data may flow from the left to the right of the figure. Accordingly, the query execution pipeline may begin on the left side.

Each node in the execution pipeline may be capable of receiving an input, processing the input in some capacity, and generating an output. The flow of data and processing between nodes is indicated by the arrows. In the example depicted in FIG. 3, nodes 301 and 302 receive raw data (e.g., data records from one or more databases). Each of nodes 301 and 302 may process its inputs and provide outputs to a child node such as node 303. Node 303 may in turn process the inputs received from nodes 301 and 302 and provide its outputs to node 304. In this manner, processing in the execution pipeline may proceed from left to right with node 305 being the last node and outputting the final output. In this manner, as the processing flows downstream through the various nodes in the execution pipeline, the data records are further manipulated and processed until a final output is produced by node 305. This final output may represent the query results and contain the information requested in the query.

For a particular node within an execution pipeline, the set of nodes comprising the parents of the particular node and the children of the particular node may be referred to as the neighbors of the particular node. For example, for the execution pipeline depicted in FIG. 3, nodes 301, 302, and 304 are considered the immediate neighbors of node 303. Likewise, nodes 303 and 305 are considered immediate neighbors of node 304. Node 304 is the immediate neighbor of node 305.

For a particular node within an execution pipeline, a node in the directed acyclic graph is considered downstream from the particular node if there is a path that can be traversed in the directed acyclic graph from the particular node to that node. For example, for the execution pipeline depicted in FIG. 3, nodes 303, 304, and 305 are downstream nodes from node 301 (and also for node 302). Node 303 is the immediate downstream node from node 301. Likewise, nodes 304 and 305 are downstream from node 303. Node 305 is downstream from node 304.

For a particular node within an execution pipeline, a node in the directed acyclic graph is considered upstream from the particular node if there is a path that can be traversed in the directed acyclic graph from that node to the particular node. For example, for the execution pipeline depicted in FIG. 3, nodes 301, 302, 303, and 304 are all downstream nodes from node 305, with node 304 being the immediate upstream node. Nodes 301, 302, and 303 are upstream from node 304. Nodes 301 and 302 are upstream from node 303.

Thus, processing in an execution pipeline flows downstream from a source or root node(s) (e.g., nodes 301 and 302 in FIG. 3) to the end node (e.g., node 305). The output of the end node represents the final output of the execution pipeline.

As described above, a change made to the execution pipeline may include changing the capabilities of one or more nodes of the execution pipeline. This can be shown using the following example. Consider a scenario where data records are capable of being stored in two different formats: a fixed-length format and a variable-length. When records are stored in fixed-length format, all the fields of the record (and hence the records themselves) have a preconfigured length or size that remains the same regardless of the data content stored by the fields For fixed length fields, if the actual string data content stored by the field is less than the size of the field, the content is padded with useless bytes often leading to wastage or inefficient use of memory. This can translate to large memory wastage for storing a large number of records in fixed-length format.

For example, consider a record with the following structure:

```
Record {
  integer  ID;      (4 bytes, assuming 4 bytes for storing an integer)
  char(20) STATE;   (40 bytes long, assuming 2 bytes for each character)
  char(30) CITY;    (60 bytes long, assuming 2 bytes for each character)
}
```

This structure may, for example, define records stored in a table. The total number of bytes needed for storing each record is thus 104 bytes (4+40+60) irrespective of the content of the various fields of the record. For example, for a record storing (ID=1; STATE=California; CITY=San Francisco) or a record storing (ID=2; STATE=Washington; CITY=Seattle), the length of the records is the same irrespective of the contents of the records. In this example, in the record whose STATE field is "California", which actually requires only 20 bytes for storage, the STATE field is padded with 20 bytes before the beginning of the CITY field. Due to their fixed length, fixed-length records are straightforward and easy to process, but often results in wasted memory and can translate to large memory wastage for storing a large number of records in fixed-length format.

Data records may also be stored in variable-length format in order to reduce the memory wastage issues associated with fixed-length records. For example, VARCHAR(n) is a data type used in SQL engines for representing strings with variable length, where n represents the maximum number of characters in a given field. For example, a variable length record (from the example above) may be defined as follows:

```
Record {
    integer  ID;
    varchar(20) STATE;   (20 = maximum number of characters in field)
    varchar(30) CITY;    (30 = maximum number of characters in field)
}
```

A variable length record may start off with the record's total length in bytes. Each variable length field also begins with the field's actual data size. So records for storing (ID=1; STATE=California; CITY=San Francisco) and (ID=2; STATE=Washington; CITY=Seattle) may be stored as follows:

| 62 | 1 | 20 | California | 26 | San Francisco |
|---|---|---|---|---|---|
| 4 bytes | 4 bytes | 4 bytes | 20 bytes | 4 bytes | 26 bytes |

Total: 62 bytes

| 62 | 2 | 20 | Washington | 26 | Seattle |
|---|---|---|---|---|---|
| 4 bytes | 4 bytes | 4 bytes | 20 bytes | 4 bytes | 14 bytes |

Total: 50 bytes

As can be seen from the above example, 62 bytes are used for storing the first record in variable length format (as opposed to 104 bytes in the fixed-length format) and 50 bytes are used for storing the second record in variable length format (as opposed to 104 bytes in the fixed-length format). It can be seen that the size of these variable-length records is smaller than the comparable fixed-length records.

Often, data records are kept in fixed-length format by default due for ease of processing. However, when it comes to query processing, variable-length record processing can often be faster than fixed-length record processing. In particular, it is faster for the steps in query processing to be performed using system memory rather than other storage means (e.g., hard disk), since it is orders of magnitude faster to read and write to system memory. Since there is a fixed amount of system memory, it is desirable to store as much information in system memory as possible in order to try and perform all of the processing strictly in system memory rather than resorting to alternatives (e.g., spilling some of the data to hard disk). Variable length-records often saves memory in comparison to fixed-length records, making it more likely that the data records used throughout the query processing can all be kept in system memory without having to use secondary storage.

Although it would be desirable to perform the entire execution pipeline from start to finish using variable-length records, it may not be practical to perform each and every step using variable-length format. The use of variable-length records may impose additional complexity and challenges for various operations and may require more processing. Some of the functions performed by certain nodes in the execution pipeline may not be able to be performed using variable-length records. In other words, some nodes in the execution pipeline may be able to process data records in variable-length format, some nodes may be able to process data records in fixed-length format, while some nodes may be able to process data records in either format. In some embodiments, all of the nodes in the execution pipeline may be able to process fixed-length records, and only some of those nodes may be able to process variable-length records as well.

Further, it may not be practical to simply convert data records to variable-length format wherever possible (e.g., repeatedly converting between fixed-length records and variable-length records based on the capabilities of each node in the pipeline), because the conversion of records between fixed-length format and variable-length format takes computation time. The repeated back-and-forth conversion would be costly and take a considerable amount of time and resources. Accordingly, for efficiency purposes (e.g., to reduce both memory usage and query execution time), it may be desirable to keep records in variable-length format for as much of the query execution pipeline as possible, while also minimizing the number of conversions between fixed-length and variable-length format. To do this, the query optimization system optimizes the execution pipeline by identifying nodes capable of processing variable-length records and having them perform variable-length record processing in a chain, so that the entire query execution pipeline is sped up by minimizing the amount of format conversions that need to take place.

In some embodiments, the query optimization system may know what the capabilities of each node are and select nodes accordingly based on the query plan. However, the inter-nodal communication method of reconfiguring the execution pipeline (as opposed to configuring the execution pipeline at instantiation) has the advantage of being more dynamic and localized. Both methods can be used to achieve the same, or a similar, execution pipeline. Either method, or a combination of both methods, can be used to configure the execution pipeline. For example, the query optimization system may create the initial execution pipeline by stringing together several pre-configured chains of nodes, and then the nodes of the execution pipeline may further communicate among themselves in order to reconfigure and modify the execution pipeline.

After an execution pipeline is instantiated, for example, in 206 in FIG. 2, the nodes in the execution pipeline may communicate with each other and via these inter-nodal communications be able to determine which other nodes are capable of handling variable-length records versus fixed-length records and the positions of those nodes within the execution pipeline. As part of identifying and making changes to the execution pipeline, for example, in 210 and 212, changes may be made to try to form chains of nodes that can do variable-length record processing so that the entire pipeline is sped up. For instance, in some embodiments, some of the nodes may be sorter nodes (e.g., nodes tasked with sorting). The sorter nodes may be configured to take an input (e.g., an input table or part of an input table), sort that input, and generate a sorted output. Some sorter nodes may be capable of handling (e.g., consuming and/or producing) fixed-length and variable-length records. Other sorter nodes may only be capable of handling fixed-length records.

Each node in the execution pipeline is aware of its own capabilities (e.g., whether it can only handle fixed-length records, or whether it has the additional ability to handle variable-length records). Thus, each node in the pipeline may communicate with the nodes immediately upstream and downstream of it (e.g., the immediate neighbors) in order to assess whether those immediate neighbors are capable of handling variable-length records (or are restricted to handling fixed-length records). In some embodiments, each node is aware of whether it can consume and/or produce a certain type of data record. Thus, each node may assess a neighboring node at a more-granular level, such as by determining whether a neighboring node can consume and/or produce variable-length records based on the arrangement of the nodes. For example, an upstream node (e.g., node 304) capable of producing variable-length records may be interested in determining whether a neighboring downstream node (e.g., node 305) is capable of receiving and consuming variable-length records. Based upon this determination, node 304 may change the format of its output format node 305 to be of a fixed-length type or a variable-length type. For example, upon instantiation of the execution pipeline, the format of the output of node 304 to node 305 may be fixed-length type (and the format of the input of node 305 from 304 may also be fixed-length type). Based upon inter-nodal communications, node 304 may determine that the immediately downstream node 305 is capable of consuming inputs of a variable-length type format and that node 304 is itself capable of providing a variable-length type format output. In this case, as part of optimizing the execution pipeline, node 304 may change its output format from a fixed-length type format to a variable-length type format and node 305 may change its input format from a fixed-length type format to a variable-length type format. The functions performed by nodes 304 and 305 may also be changed to handle variable-length type format instead of fixed-length type format.

The inter-nodal communication between the nodes in the execution pipeline may follow a pre-defined protocol and communication among the nodes may be propagated throughout the pipeline in various ways. In some embodiments, each node in the pipeline may communicate with its immediate neighbors all at once. For example, node 303 may communicate with its neighboring nodes (e.g., nodes 301, 303, and 304). Node 304 may communicate with its neighboring nodes 303 and 305. In some embodiments, the communication may be strictly neighbor-to-neighbor. For example, the communication may begin with nodes 301 and 302 communicating with their neighboring nodes (e.g., node 303), and that neighboring node may communicate with its neighboring nodes (e.g., node 302 and 304), creating a ripple effect of capabilities information exchange down the pipeline.

In some embodiments, the communication between two nodes (e.g., immediately neighboring nodes) may occur in two stages. At a first stage, each node will ask their neighbor regarding the neighbor's capabilities, while also advertising its own capabilities. For example, node 301 may inform node 303 that it is capable of producing variable-length records, while also querying node 303 to determine whether node 303 is capable of consuming variable-length records. At the second stage of the communication, each node may communicate instructions to its neighboring nodes after taking into consideration the capabilities of the raw data streams (e.g., the capabilities of the upstream node between two nodes) as well as the capabilities of the consumer of the output stream (e.g., the capabilities of the downstream node between two nodes). For example, if node 301 is already configured to produce variable-length records and node 301 determines that node 303 is capable of consuming variable-length records using the information obtained from the first stage of communication, then node 301 may notify node 303 that records will be passed in variable-length format to node 303. If however, node 301 determines that node 303 cannot consume variable-length records using the information obtained from the first stage of communication, node 301 may reconfigure itself (as part of the processing performed in 212) to output fixed-length records and inform node 303 that it will be providing fixed-length records and to expect fixed-length records. In this case, node 301 reconfigures itself (as part of the processing performed in 212) to output fixed length records and also to perform processing to convert records from variable-length format to fixed-length format before sending them to node 303.

As an additional example using the execution pipeline depicted in FIG. 3, consider the scenario in which node 301 is capable of producing variable-length records, node 303 is capable of consuming and producing variable-length records, but node 304 is unable to consume variable-length records. These nodes will perform inter-node communication in order to learn about their capabilities. Rather than having all three nodes process fixed-length records or having node 301 convert variable-length records to fixed-length records to send to node 303, the execution pipeline may be reconfigured as follows. Node 301 may be configured to produce and output variable-length records which are received by node 303 as input. Node 303 processes the variable-length records before converting them to fixed-length records and then providing the fixed-length records as output to node 304, which is only capable of handling fixed-length records. In this scenario, as part of the processing performed in 212, node 303 reconfigures itself to output fixed-length records and also to perform processing to convert records from variable-length format to fixed-length format before sending them to node 304. This reconfiguration and optimization of the execution pipeline enables more of the processing of the records to be performed in variable-length format (e.g., node 301 and node 303 both process variable-length records before the query execution pipeline switches over to fixed-length records). If however, node 303 were not capable of consuming and producing variable-length records, then node 301 would have to reconfigure itself to produce fixed-length records to output to node 303. Node 303 would inform its neighbor downstream (e.g., node 304) to expect fixed-length records.

Thus, each node may reconfigure itself based its own capabilities and based upon the capabilities of its immediate neighbors as well as other nodes in the execution pipeline. Once the reconfiguration is complete, the nodes may inform their immediate neighbors and other nodes of the reconfiguration. This information may then propagated throughout the execution pipeline as a result of the inter-nodal communications between the nodes of the execution pipeline. In this manner, the nodes take into consideration the current execution environment in order to dynamically reconfigure themselves into the most optimal configuration for that particular execution instance in order to increase execution efficiency. As a result, the initial configuration of the execution pipeline when instantiated may be changed from the initial configuration to a new optimized configuration that is better adapted to the capabilities of that particular execution instance. This provides a big improvement over conventional execution pipeline techniques wherein such reconfiguration was not performed.

Figure 4:
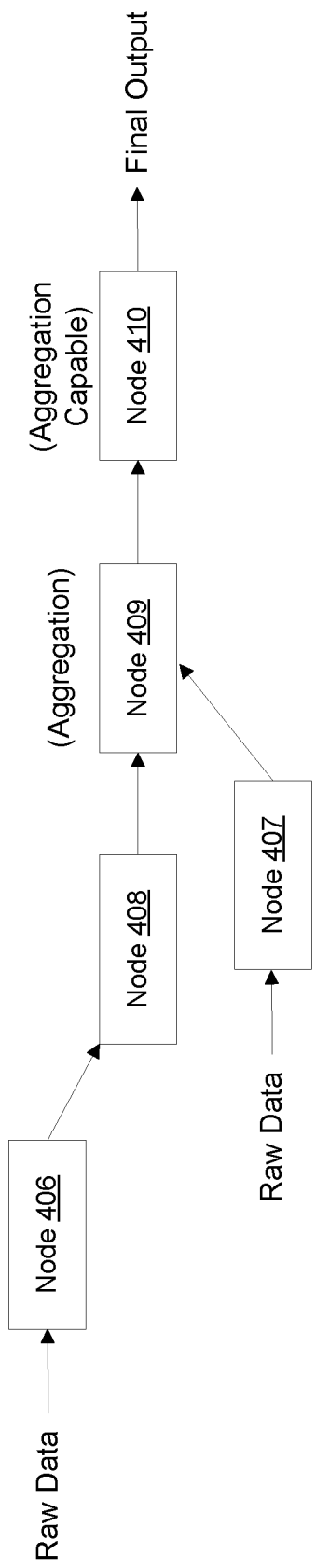
FIG. 4 illustrates an example of optimizing an execution pipeline wherein a function performed by one node is transferred to a downstream node within the execution pipeline according to certain embodiments.

In certain embodiments, an execution pipeline may be modified such that a function performed by a particular node within the execution pipeline is transferred to another node within the execution pipeline. FIG. 4 illustrates an example of optimizing an execution pipeline wherein a function performed by one node is transferred to a downstream node within the execution pipeline according to certain embodiments. The execution pipeline depicted in FIG. 4 is merely an example and is not intended to unduly limit the scope of claimed embodiments. The example is provided for the purposes of facilitating the understanding of inter-node communication and the dynamic self-reconfiguration of nodes. One of ordinary skill in the art would recognize many possible variations, alternatives, and modifications. In some implementations, there may be a different number of nodes, the nodes may execute different functions from what is depicted, and/or the nodes may also be arranged differently. For instance, although FIG. 4 depicts an execution pipeline having a node 406, a node 407, a node 408, a node 409, and a node 410, in other embodiments, there may be a different number of nodes and they may be arranged differently in the execution pipeline. In the execution pipeline shown in FIG. 4, processing and data may flow from the left to the right of the figure.

For instance, in FIG. 4, nodes 406 and node 407 receive raw data (e.g., data records from one or more databases). As the processing flows downstream in the execution pipeline, the data records are further manipulated and processed until a final output is produced by node 410. This final output will be the query results and contain the information requested in the query.

In certain embodiments, the nodes in this execution pipeline may be reconfigured to transfer processing responsibility between one or more of the nodes. For instance, when the execution pipeline is first instantiated, node 409 may be configured to perform the step of aggregation. However, there may be advantages to reconfiguring the nodes so that aggregations are computed as far out (e.g., as late) in the pipeline as possible. This is because aggregation is a blocking operation, which means performing it requires access to all of the input data at that stage (e.g., data has to be processed by nodes of earlier stages) and this blocks the execution pipeline until all the data that is needed is available. Nodes downstream from (or after) an aggregation node would remain idle until all of the records are processed by the node doing the aggregation. Thus, it is often beneficial to move aggregation to the last possible node within the execution pipeline.

After the query execution pipeline is instantiated, inter-node communication may be used to determine which node(s) within the instantiated execution pipeline are currently configured to perform aggregation functions. For instance, for the example depicted in FIG. 4, it may be determined that node 409 is configured to perform an aggregation function. As shown in FIG. 4, node 409 takes in data records processed and output by both node 407 and node 408. Node 408 receives data records that are processed and output by node 406. Thus, node 409 may receive data records from node 407 and node 408 at different times. However, node 409 may need to have all of those data records in order to perform the aggregation operation. As a result, node 409 is dependent on both node 407 and node 408, and node 410 would remain idle until node 409 completed the aggregation operation. Thus, it would be desirable to move the aggregation function to a node that is further down the pipeline.

To remedy this, a further determination, again based upon the inter-nodal communication, may be made to determine if any downstream node from node 409 can also perform the aggregation function. If so, the aggregation function may be transferred to that downstream node so as to push the function closer towards the end of the execution pipeline. In this manner, the execution pipeline may be reconfigured such that the aggregation function is transferred from node 409 to the downstream node. For the example in FIG. 4, node 409 may learn that node 410 is capable of performing aggregation (e.g., in the first stage of communication). Node 409 may then cause the aggregation function responsibility to be transferred to node 410 (e.g., in the second stage of communication). As part of this processing, node 409 would reconfigure itself to not perform the aggregation while node 410 would be reconfigured to perform the aggregation function. In this manner, the task of aggregation may be pushed later down the pipeline than in the initially instantiated execution pipeline.

Although not depicted in FIG. 4, the task of aggregation may be pushed further than one adjoining node. For example, if there were a node immediately downstream from node 410 in the execution pipeline, node 410 may communicate with that downstream node and learn that the downstream node is capable of performing the aggregation function and transfer responsibility for the aggregation function from node 410 to that downstream node. In this manner, the task of aggregation may be pushed as far downstream in the pipeline as possible. This example illustrates how nodes can dynamically self-reconfigure to transfer processing responsibility and the computational efficiency gains that can be obtained through these techniques.

The aggregation function discussed above is just an example of a function whose performance may be changed within the execution pipeline. There are other functions where the responsibility for performing the function may be transferred from one node to another node within the execution pipeline. As in the case of the aggregation function, for certain functions, it may be desirable to move the function responsibility to a node that is further downstream from the node initially tasked with performing the function. For some other functions (e.g., filter function, as further described below), it may be more desirable to move the function responsibility further upstream from the node originally tasked with performing the function. For yet other functions, the responsibility be moved to yet other nodes within the execution pipeline. In this manner, the execution pipeline customizations are specific to that instantiated execution pipeline (e.g., specific to the nodes within the execution pipeline, the arrangement of nodes within the directed acyclic graph, and the functionalities of the nodes).

Figure 5:
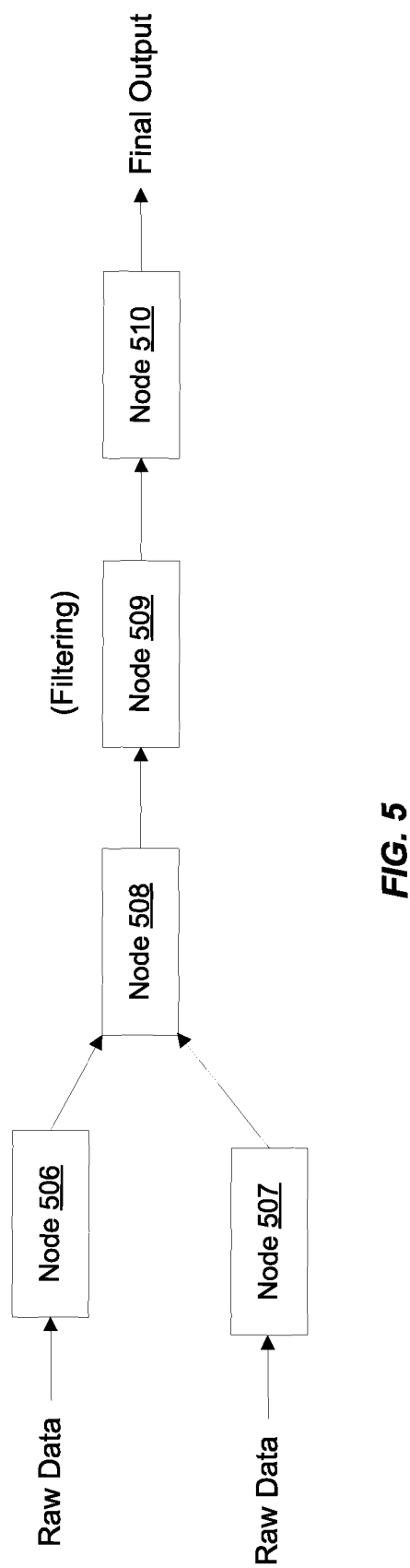
FIGS. 5 and 6 illustrate an example of modifying an execution pipeline according to certain embodiments.
Figure 6:
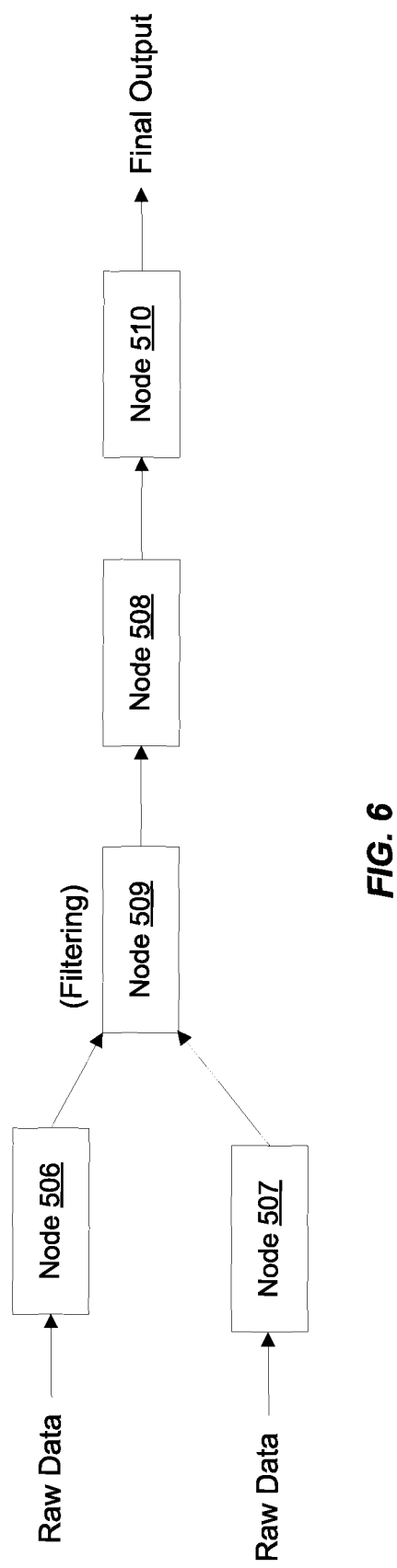

FIGS. 5 and 6 illustrate another example of modifying an execution pipeline according to certain embodiments. The execution pipeline depicted in FIGS. 5 and 6 is merely an example and is not intended to unduly limit the scope of claimed embodiments. The example is provided for the purposes of facilitating the understanding of inter-node communication and the dynamic self-reconfiguration of nodes. One of ordinary skill in the art would recognize many possible variations, alternatives, and modifications. In some implementations, there may be a different number of nodes, the nodes may execute different functions from what is depicted, and the nodes may also be arranged differently. For instance, although FIGS. 5-6 depict an execution pipeline having a node 506, a node 507, a node 508, a node 509, and a node 510, in other embodiments, there may be a different number of nodes and they may be arranged differently in the execution pipeline. In the execution pipeline depicted in FIGS. 5 and 6, processing and data may flow from the left to the right of the figure.

In the example depicted in FIG. 5, node 506 and 507 receive raw input data (e.g., data records from one or more databases). As the processing flows downstream in the query execution pipeline, the data records are further manipulated and processed until a final output is produced by node 510. This final output may represent the query results and contain the information requested in the query.

In the example depicted in FIG. 5, when the execution pipeline is instantiated, node 509 is configured to perform a filtering function. It is preferred in an execution pipeline that a filtering function be performed closer towards the top or head of the execution pipeline (i.e., closer to the root of the execution pipeline directed acyclic graph). By doing this, the amount of data that has to be passed through the pipeline can be reduced. The nodes downstream from the node performing the filter function have to process less data (because some of the data has been filtered out due to the filter function) and can thus perform their functions faster and more efficiently. Thus, it is often beneficial to move filter functions to the earliest possible node within the execution pipeline. Accordingly, certain operations (e.g., filtering) may improve query execution efficiency when performed closer to the data source (i.e., closer to the start of the execution pipeline), since it reduces the number of data records being processed in subsequent downstream nodes. If a node is configured to performing a filtering operation, processing speed is improved by moving that node towards the head of the execution pipeline.

After the query execution pipeline is instantiated, inter-node communication may be used to determine which node(s) within the instantiated execution pipeline are currently configured to perform filter functions. For instance, for the example depicted in FIG. 5, it may be determined that node 509 is configured to perform a filter function. A further determination, again based upon the inter-nodal communication, may be made to determine if any nodes upstream from node 509 can be reconfigured to perform the filter function. If so, in certain embodiments, the filter function may be transferred to that upstream node so as to push the function closer towards the start of the execution pipeline. In this manner, the execution pipeline may be reconfigured such that the filter function is transferred from node 509 to a node that is upstream from node 509. For the example in FIG. 5, the function may be transferred from node 509 to one of nodes 506, 507, or 508. This transfer may be achieved by the relevant nodes reconfiguring their capabilities.

In certain embodiments, instead of transferring the filter function from node 509 to an upstream node in the execution pipeline, the query optimization system may cause the ordering of the nodes themselves to be changed. For example, the position of node 509 in the execution pipeline may be changed to a new position within the execution pipeline such that the new position of node 509 within the execution pipeline is further upstream from the position depicted in FIG. 5 when the execution pipeline is first instantiated. Query optimization system may then instruct the nodes to re-arrange themselves such that node 509 becomes upstream to node 508 as depicted in FIG. 6. In certain embodiments, node 509 may itself perform processing to change its position within the execution pipeline. Information regarding its new position may then be communicated to other nodes in the execution pipeline. In essence, node 509 is moved closer to the root or source (e.g., nodes 506 and 507) of the execution pipeline. The resulting modified execution pipeline depicted in FIG. 6 has node 509 performing filtering immediately downstream from nodes 506 and 507, while node 508 is now immediately downstream from node 509.

As described above, modifying the execution pipeline to generate a modified execution pipeline may involve changing the positions of one or more nodes within the instantiated execution pipeline to new positions in the modified execution pipeline. For example, a node configured to perform a filter function may be moved upstream and closer to the root of the execution pipeline. Thus, prior to the modifying of the execution pipeline, a particular node may be positioned at a first distance from the source root node, and after the modification, the particular node may be positioned at a second distance from the source root node, where the second distance is different from the first distance. In the case of the filter function, the second distance is less than the first distance. The distance between two nodes in the execution pipeline may be measured by the number of edges (or nodes) traversed when traversing a path from the first node to the second node. For example, in FIG. 5, the distance between root node 506 and node 509 is two edges (or one intermediate node). In the modified execution pipeline depicted in FIG. 6, the distance between root node 506 and node 509 is one edge (or zero intermediate nodes).

While in the example described above for the filter function, node 509 is moved upstream from its initial position, this is not intended to be limiting. In other scenarios (e.g., for some other functions), a node may be moved further downstream, from its initial position, or to some other position within the execution pipeline directed acyclic graph.

As described above, novel techniques are disclosed for dynamically, and during runtime, optimizing an execution pipeline generated for a query. Nodes within an execution pipeline are able to, using inter-nodal communications, advertise their capabilities to other nodes within the execution pipeline and learn the capabilities of the other nodes. These learned capabilities along with the nature of the inputs to the execution pipeline and the structure and capabilities of the execution pipeline are used to dynamically make changes or modifications to the initially instantiated execution pipeline to generate an optimized modified execution pipeline. In this manner, communication between the nodes in the execution pipeline is used to drive the changes and optimizations that are made to the execution pipeline based upon the current execution environment. The optimizations may lead to faster performance (e.g., faster execution of the execution pipeline and the query), a more streamlined data flow through the execution pipeline, grouping of related functions to improve efficiency, and other optimizations. The optimized modified execution pipeline may then be executed to generate results for the query.

Figure 7:
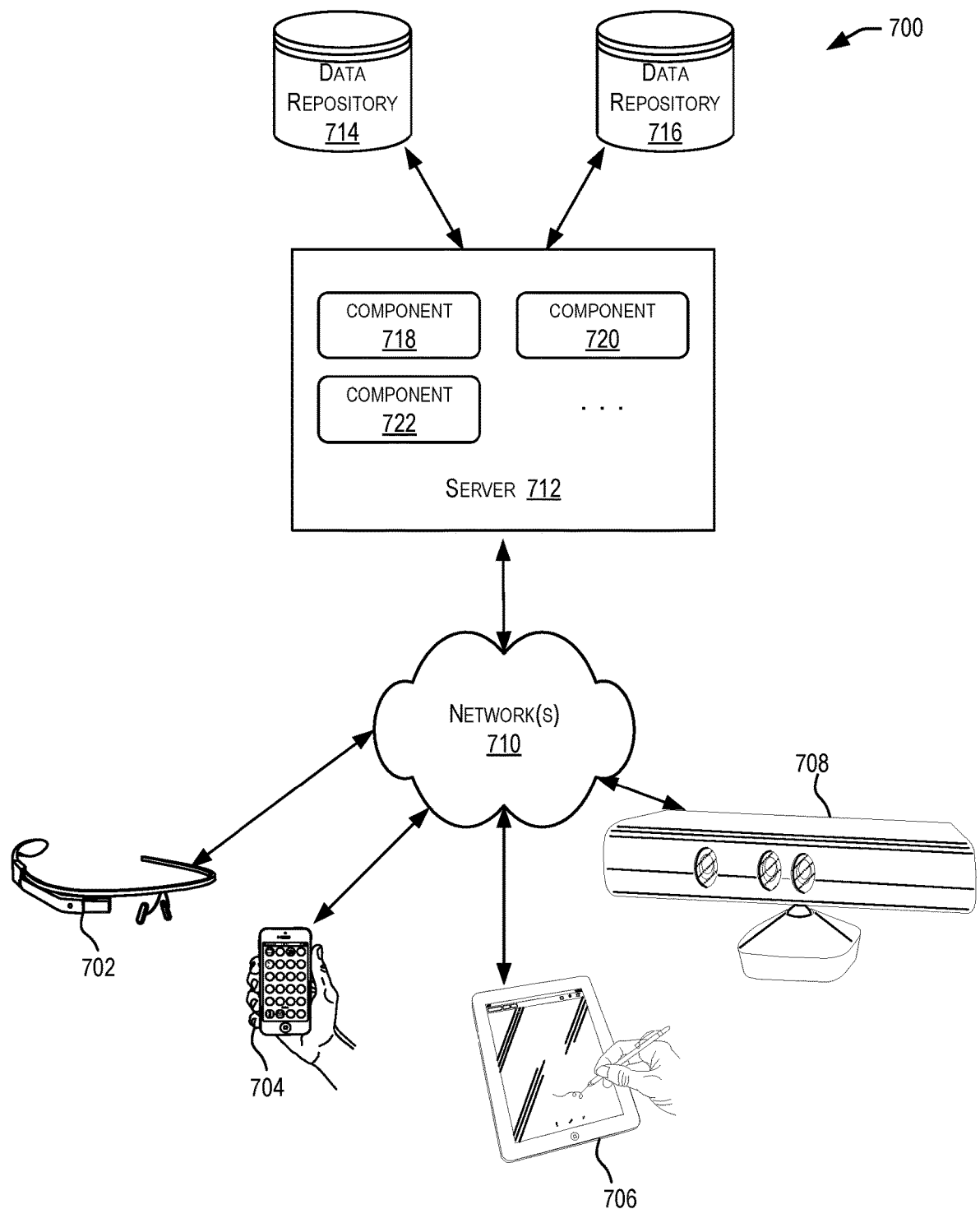
FIG. 7 depicts a simplified diagram of a distributed system for implementing certain embodiments.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable the memory management techniques described herein.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
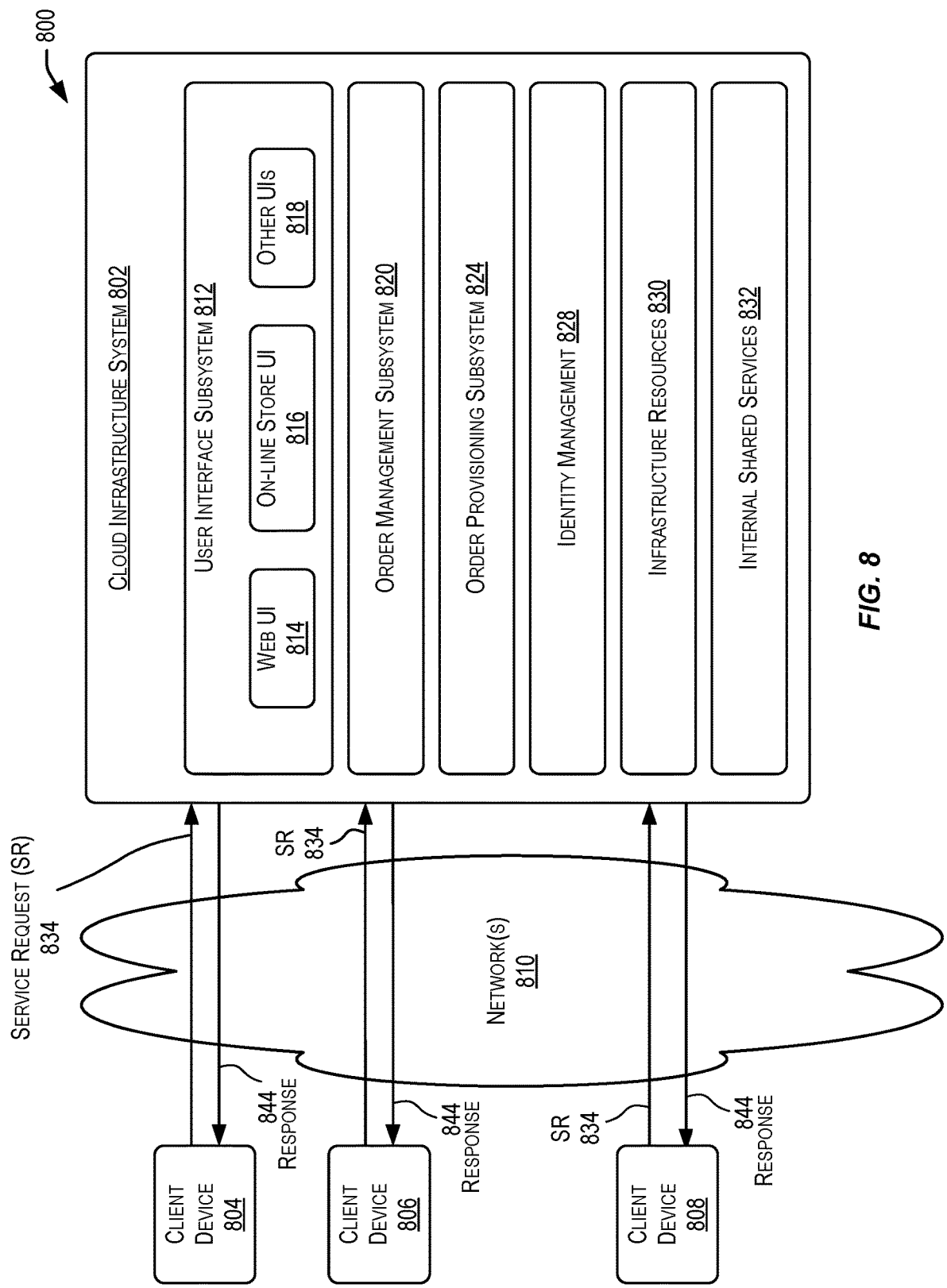
FIG. 8 is a simplified block diagram of a cloud-based system environment in which various services may be offered as cloud services, in accordance with certain embodiments.

In certain embodiments, the memory management-related functionalities described in this disclosure may be offered as services via a cloud environment. FIG. 8 is a simplified block diagram of a cloud-based system environment in which sorting-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. Cloud infrastructure system 902 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802.

In some embodiments, the processing performed by cloud infrastructure system 802 for providing services may involve big data analysis. This analysis may involve using, analyzing, and manipulating and sorting large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, information access management, authentication and authorization services, services for managing customer identities and roles and related capabilities, and the like.

Figure 9:
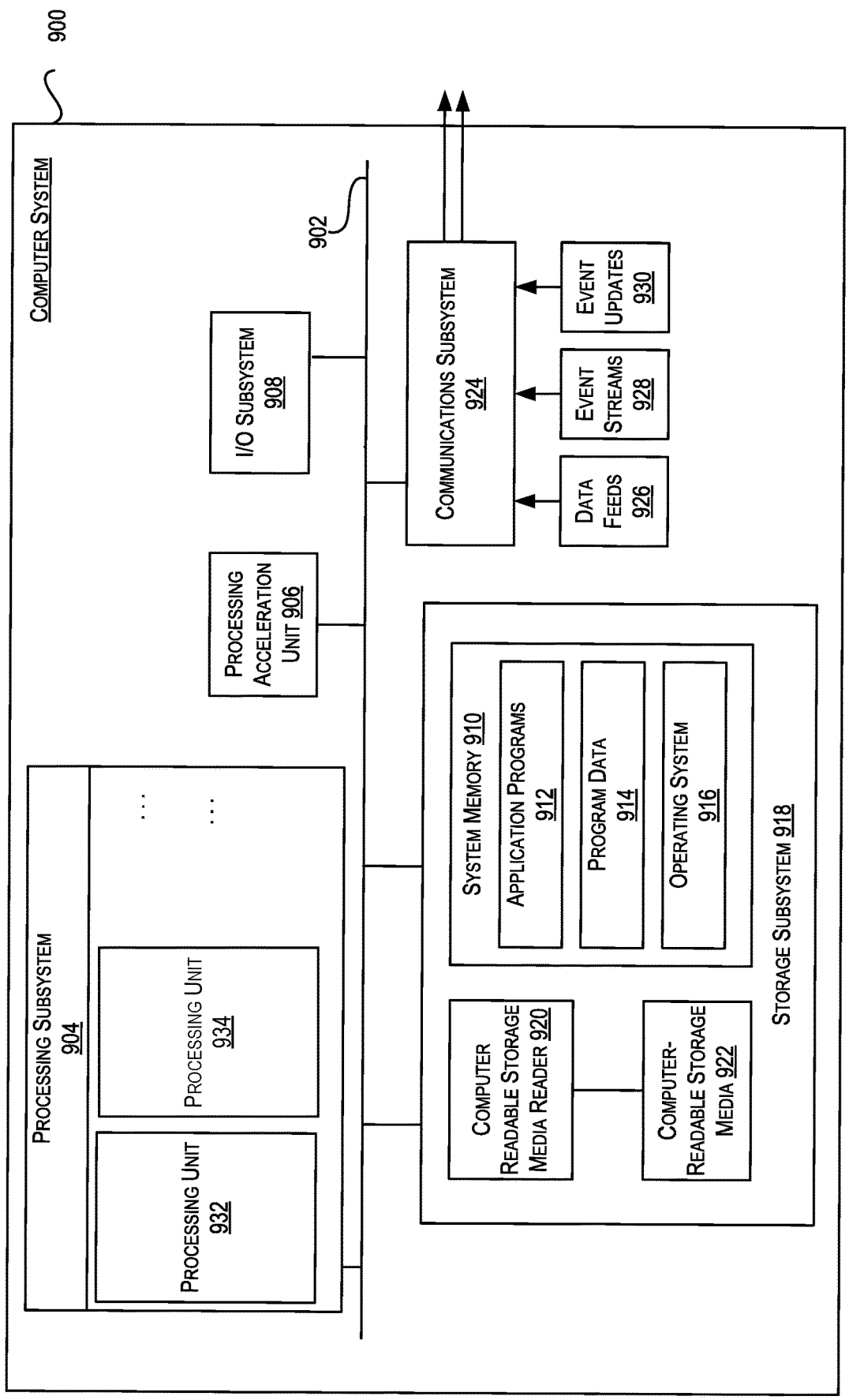
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement data processing system 100 depicted in FIG. 1. Data processing system 100 may comprise one or more computer systems 900. Computer system 900 may also be used to perform the various processing described in this disclosure. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method for processing a query, the method comprising:
   generating a query plan for the query;
   instantiating, by a data processing system, an execution pipeline for executing the query based upon the query plan, wherein the execution pipeline comprises a directed acyclic graph comprising a plurality of nodes,
   determining, by at least a first node in the plurality of nodes, capabilities of one or more neighboring nodes in the plurality of nodes, wherein the determining comprises:
      communicating, by the first node to the one or more neighboring nodes of the first node within the execution pipeline, information identifying a capability of the first node; and
      receiving, by the first node from at least one neighboring node of the one or more neighboring nodes within the execution pipeline, information identifying a capability of the at least one neighboring node;
   identifying, by the data processing system, based upon the capability of the first node, the capability of the at least one neighboring node, or a combination thereof, a change to be made to the execution pipeline, the change involving the first node, the at least one neighboring node, or a combination thereof;
   applying the change to the execution pipeline to create a modified execution pipeline, wherein the applying comprises reconfiguring the first node, the at least one neighboring node, or a combination thereof, wherein the reconfiguring the first node comprises: (i) changing a type of an input or an output of the first node from a first type to a second type different from the first type, and (ii) reconfiguring a function performed by the first node from handling the first type to handling the second type, and wherein: (a) the first type is a variable length record type and the second type is a fixed length record type, or (b) the first type is a fixed length record type and the second type is a variable length record type; and
   executing the query by executing the modified execution pipeline.

2. The method of claim 1, wherein applying the change to the execution pipeline includes reconfiguring a position of the first node within the directed acyclic graph.

3. The method of claim 2, wherein:
   prior to the applying, the first node is positioned downstream in the directed acyclic graph from a second node in the plurality of nodes; and
   reconfiguring the position of the first node within the directed acyclic graph comprises moving the first node to a new position within the directed acyclic graph wherein the first node is upstream from the second node in the modified execution pipeline.

4. The method of claim 3, wherein the second distance is less than the first distance.

5. The method of claim 2, wherein:
   prior to the applying, the first node is at a first distance from a source root node in the directed acyclic graph; and
   reconfiguring the position of the first node within the directed acyclic graph comprises changing the first node to a new position within the directed acyclic graph at a second distance from the source root node, the second distance being different from the first distance.

6. The method of claim 1, further comprising receiving, by the first node from at least one neighboring node of the first node within the execution pipeline, information identifying a capability of a node in the plurality of nodes other than the first node and the at least one neighboring node of the first node.

7. A non-transitory computer-readable medium storing instructions that, when executed by a processor, cause the processor to perform processing comprising:
   generating a query plan for a query;
   instantiating an execution pipeline for executing the query based upon the query plan, wherein the execution pipeline comprises a directed acyclic graph comprising a plurality of nodes,
   determining, by at least a first node in the plurality of nodes, capabilities of one or more neighboring nodes in the plurality of nodes, wherein the determining comprises:
      communicating, by the first node to the one or more neighboring nodes of the first node within the execution pipeline, information identifying a capability of the first node; and
      receiving, by the first node from at least one neighboring node of the one or more neighboring nodes within the execution pipeline, information identifying a capability of the at least one neighboring node;
   identifying, based upon the capability of the first node, the capability of the at least one neighboring node, or a combination thereof a change to be made to the execution pipeline, the change involving the first node, the at least one neighboring node, or a combination thereof;
   applying the change to the execution pipeline to create a modified execution pipeline, wherein the applying comprises reconfiguring the first node, the at least one neighboring node, or a combination thereof within the directed acyclic graph, wherein the reconfiguring the first node comprises: (i) changing a type of an input or an output of the first node from a first type to a second type different from the first type, and (ii) reconfiguring a function performed by the first node from handling the first type to handling the second type, and wherein: (a) the first type is a variable length record type and the second type is a fixed length record type, or (b) the first type is a fixed length record type and the second type is a variable length record type; and
   executing the query by executing the modified execution pipeline.

8. The non-transitory computer-readable medium of claim 7, wherein applying the change to the execution pipeline includes changing a position of the first node within the directed acyclic graph.

9. A data processing system comprising:
   one or more processors;
   memory associated with the one or more processors, the memory storing instructions that when executed by the one or more processors cause the one or more processors to perform processing comprising:
      generating a query plan for a query;
      instantiating an execution pipeline for executing the query based upon the query plan, wherein the execution pipeline comprises a directed acyclic graph comprising a plurality of nodes,
      determining, by at least a first node in the plurality of nodes, capabilities of one or more neighboring nodes in the plurality of nodes, wherein the determining comprises:
         communicating, by the first node to the one or more neighboring nodes of the first node within the execution pipeline, information identifying a capability of the first node; and
         receiving, by the first node from at least one neighboring node of the one or more neighboring nodes within the execution pipeline, information identifying a capability of the at least one neighboring node;
      identifying, based upon the capability of the first node, the capability of the at least one neighboring node, or a combination thereof, a change to be made to the execution pipeline, the change involving the first node, the at least one neighboring node, or a combination thereof;
      applying the change to the execution pipeline to create a modified execution pipeline, wherein the applying comprises reconfiguring the first node, the at least one neighboring node, or a combination thereof within the directed acyclic graph, wherein the reconfiguring the first node comprises: (i) changing a type of an input or an output of the first node from a first type to a second type different from the first type, and (ii) reconfiguring a function performed by the first node from handling the first type to handling the second type, and wherein: (a) the first type is a variable length record type and the second type is a fixed length record type, or (b) the first type is a fixed length record type and the second type is a variable length record type; and
      executing the query by executing the modified execution pipeline.

10. The data processing system of claim 9, wherein applying the change to the execution pipeline includes changing a position of the first node within the directed acyclic graph.

* * * * *

UNITED STATES PATENT AND TRADEMARK OFFICE
CERTIFICATE OF CORRECTION

Page 1 of 1

PATENT NO. : 10,970,284 B2
APPLICATION NO. : 15/977816
DATED : April 6, 2021
INVENTOR(S) : Mittal et al.

It is certified that error appears in the above-identified patent and that said Letters Patent is hereby corrected as shown below:

In the Specification

In Column 21, Line 46, delete "iPhone)," and insert -- iPhone®), --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*